United States Patent
Thomassey (10) Patent No.: US 11,520,329 B2
(45) Date of Patent: Dec. 6, 2022

(54) METHOD AND A SYSTEM FOR DETECTING WIRE OR WIRE-LIKE OBSTACLES FOR AN AIRCRAFT

(71) Applicant: AIRBUS HELICOPTERS, Marignane (FR)

(72) Inventor: Lionel Thomassey, Foss sur Mer (FR)

(73) Assignee: Airbus Helicopters (FR)

( * ) Notice: Subject to any disclaimer, the term of this patent is extended or adjusted under 35 U.S.C. 154(b) by 0 days.

(21) Appl. No.: 17/022,437

(22) Filed: Sep. 16, 2020

(65) Prior Publication Data

US 2021/0096561 A1   Apr. 1, 2021

(30) Foreign Application Priority Data

Sep. 27, 2019   (FR) ...................................... 1910682

(51) Int. Cl.
*G05D 1/00*   (2006.01)
*G05D 1/10*   (2006.01)
(Continued)

(52) U.S. Cl.
CPC ............ *G05D 1/0038* (2013.01); *G01S 13/08* (2013.01); *G01S 17/08* (2013.01); *G05D 1/106* (2019.05);
(Continued)

(58) Field of Classification Search
CPC .................................................... G05D 1/0038
See application file for complete search history.

(56) References Cited

U.S. PATENT DOCUMENTS

| | | | |
|---|---|---|---|
| 7,010,398 B2 * | 3/2006 | Wilkins, Jr | G01C 23/005 701/1 |
| 7,379,014 B1 * | 5/2008 | Woodell | G01S 13/87 342/29 |

(Continued)

FOREIGN PATENT DOCUMENTS

| | | | |
|---|---|---|---|
| CN | 108805050 A | * | 11/2018 |
| CN | 108805050 A | | 11/2018 |

(Continued)

OTHER PUBLICATIONS

Of NPL, Katzourakis, Diomidis, et al., Road-Departure Prevention in an Emergency Obstacle Avoidance Situation, IEEE Transactions on Systems, Man, and Cybernetics: Systems, vol. 44, No. 5, May 2014 621 (https://ieeexplore.ieee.org/stamp/stamp.jsp?tp=&arnumber=6572813) (hereinafter "Katzourakis").*

(Continued)

*Primary Examiner* — Jean Paul Cass
(74) *Attorney, Agent, or Firm* — Brooks Kushman P.C.

(57) ABSTRACT

A method and a system for detecting wire or wire-like obstacles, which method and system are designed for an aircraft. The system for detecting wire or wire-like obstacles comprises a detection device, such as a video camera or a LIDAR device, a computer and a display device. The method includes a step of detecting at least one pylon in the surrounding environment of the aircraft via a detection device, a step of identifying a family of pylons to which each detected pylon corresponds, a step of characterizing at least one cable supported by the at least one detected pylon, and a step of determining a prohibited zone that can potentially contain each pylon and each cable and a safe zone not containing either a pylon or a cable. The prohibited zone and the safe zone may be displayed on the display device.

24 Claims, 5 Drawing Sheets

(51) Int. Cl.
  *G01S 13/08* (2006.01)
  *G01S 17/08* (2006.01)
  *G08G 5/04* (2006.01)
  *G08G 5/06* (2006.01)
  *G06V 10/75* (2022.01)
  *G06V 20/10* (2022.01)

(52) U.S. Cl.
  CPC .......... *G06V 10/751* (2022.01); *G06V 20/176* (2022.01); *G08G 5/045* (2013.01); *G08G 5/065* (2013.01)

(56) References Cited

U.S. PATENT DOCUMENTS

| | | | | |
|---|---|---|---|---|
| 7,397,014 | B2* | 7/2008 | Hart | F16M 13/04 |
| | | | | 219/121.68 |
| 8,380,367 | B2* | 2/2013 | Schultz | G01S 13/862 |
| | | | | 701/16 |
| 8,773,299 | B1 | 7/2014 | Woodell et al. | |
| 2005/0134440 | A1* | 6/2005 | Breed | G01S 17/931 |
| | | | | 701/45 |
| 2010/0292871 | A1* | 11/2010 | Schultz | G01S 13/865 |
| | | | | 342/29 |
| 2011/0225212 | A1 | 9/2011 | Pire et al. | |
| 2014/0177928 | A1 | 6/2014 | Bangay | |
| 2015/0364047 | A1 | 12/2015 | Block | |
| 2016/0217696 | A1* | 7/2016 | Ott | G08G 5/0086 |
| 2020/0003895 | A1* | 1/2020 | Soli | G01S 13/75 |

FOREIGN PATENT DOCUMENTS

| | | | |
|---|---|---|---|
| CN | 109543595 A | 3/2019 | |
| FR | 2957447 A1 | 9/2011 | |
| JP | H10123245 A | 5/1998 | |
| JP | 2002087394 A | 3/2002 | |
| WO | WO-2005058536 A1 * | 6/2005 | ............. B60R 11/04 |
| WO | WO-2006083408 A1 * | 8/2006 | ........... G08G 5/0086 |

OTHER PUBLICATIONS

French Search Report for French Application No. FR 1910682, Completed by the French Patent Office, dated Jun. 26, 2020, 9 pages.

* cited by examiner

METHOD AND A SYSTEM FOR DETECTING WIRE OR WIRE-LIKE OBSTACLES FOR AN AIRCRAFT

CROSS-REFERENCE TO RELATED APPLICATIONS

This application claims priority to French patent application No. FR 1910682 filed on Sep. 27, 2019, the disclosure of which is incorporated in its entirety by reference herein.

BACKGROUND OF THE INVENTION

(1) Field of the Invention

The invention lies in the technical field of obstacle detection systems for aircraft.

The present invention relates to a method of detecting wire or wire-like obstacles, e.g. of the cable or wire type, and to a system for detecting wire or wire-like obstacles, as well as to a vehicle equipped with such a system.

(2) Description of Related Art

An aircraft can fly at low altitude and thus close to a terrain and to obstacles that might be situated on the terrain.

An aircraft can then be equipped with an obstacle detection system. For example, an obstacle detection system for an aircraft is known as an "Obstacle Warning System" or "OWS".

An obstacle detection system may use a detector of the radar or laser rangefinder type or indeed of the stereoscopic rangefinder type.

For example, an obstacle detection system may include an obstacle detector known as a "Light Detection and Ranging" or "LIDAR" detector, or as an "LED Detection and Ranging" or "LEDDAR" detector, or indeed a radar detector. Such an obstacle detector includes an emitter that emits a detection signal and a receiver that receives the detection signal as reflected by an obstacle. Measuring the time that elapses from emission of the detection signal to reception of the reflected signal makes it possible to deduce the distance at which the obstacle is situated.

For example, a radar detector uses radio waves while a LIDAR detector uses a light beam.

An obstacle detection system may include at least one video camera and a computer that analyzes the captured images in order to detect any obstacle.

Such obstacle detection methods and systems are effective for detecting voluminous obstacles such as ground relief and buildings. However, it can be difficult to detect wire or wire-like obstacles such as an electricity cable or a cable-car cable, for example.

And yet it is advantageous to be capable of detecting such wire or wire-like obstacles or at least to be capable of determining an airspace zone in which flight should be prohibited and in which a wire or wire-like obstacle might be situated, and a safe airspace zone that is devoid of any obstacle. Wire or wire-like obstacles can be a major hazard for aircraft, and in particular for rotary-wing aircraft.

For example, Documents CN 108805050 and CN 109543595 disclose methods of detecting electricity cables that are based on analyzing an image of the surrounding environment, and then displaying each detected obstacle so as to warn a pilot of the aircraft. Firstly, the image of the surrounding environment is captured, and then converted in real time into a grayscale image. Automatic analysis of such a grayscale image, and extraction of any cables are performed, for example, as described by Document CN 109543595, by applying a neural network and a Hough transform.

Document FR 2 957 447 discloses a method making it possible to fly at low altitude in an aircraft by taking into account any presence of a wire or wire-like obstacle. That method determines a safe volume over unsafe terrain, and in particular a high point of that unsafe terrain. The high point is considered as potentially being a pylon or tower that can support a cable. In that way, the safe volume takes into account any presence of cables extending from that high point of the unsafe relief.

In addition, Document U.S. Pat. No. 8,773,299 discloses a system and a method for detecting wires using radar in an aircraft. One or more vertical structures that might be pylons or towers can be detected by the radar, and a potential location for cables strung between the vertical structures can be determined by the detection system. That detection system can check for existence of cables at that potential location.

The technological background of the invention also includes Documents US 2015/0364047, US 2014/0177928, JP H10123245 and JP 2002-087394.

BRIEF SUMMARY OF THE INVENTION

An object of the present invention is therefore to propose a method and a system for detecting wire or wire-like obstacles that makes it possible to overcome the above-mentioned limitations, and that aims to optimize detecting and signaling potential obstacles.

A wire or wire-like obstacle may, for example, be an electricity cable, a cable-car cable or indeed any wire whatsoever. With concern for simplification, the term "cable" is used below to designate a wire or wire-like obstacle, regardless of its shape and of its dimensions.

The present invention relates firstly to a method of detecting wire or wire-like obstacles, which method is designed for an aircraft. For example, this aircraft includes at least one detection device.

The method of the invention for detecting wire or wire-like obstacles is remarkable in that it comprises the following steps:

detecting at least one pylon in the surrounding environment of the aircraft;

identifying a family of pylons to which said at least one detected pylon corresponds from among a database of families of pylons;

characterizing at least one cable supported by said at least one detected pylon on the basis of said database; and determining a prohibited zone that can potentially contain said at least one detected pylon and said at least one cable and a safe zone not containing either said at least one pylon or said at least one cable.

A cable is generally supported by a pylon or tower that may be of various shapes. A pylon is generally of large dimensions, namely it is tall, wide and/or voluminous, and is thus more readily visible and/or detectable than a cable, regardless of the method of detection used and regardless of the surrounding environment, e.g. in the presence of fog or of rain, or indeed depending on the seasons that can lead to changes in vegetation density and color. Due to its dimensions, a pylon may thus make it possible to anticipate the potential presence of a cable or of a plurality of cables, and, where applicable, to maneuver to avoid said cable(s).

Therefore, the method of the invention advantageously makes it possible, in a first stage, to detect at least one pylon that might potentially support a cable, and to delimit the zone in which the cable(s) supported by the pylon can be situated, and zones in which said at least one detected pylon is situated and in which, potentially, the other pylons also supporting said cable(s) are situated.

Thus, the method advantageously makes it possible to determine a prohibited zone that can potentially contain at least one pylon and at least one cable and that is therefore to be avoided during the flight of the aircraft. The method also makes it possible to determine a safe zone that does not contain any pylon or any cable, and thus that is potentially to be used for safe flight of the aircraft.

The prohibited zone may be formed by one or more sub-zones, e.g. a respective sub-zone associated with each detected pylon and a sub-zone associated with the cable(s) supported by each detected pylon.

The safe zone may also be formed by one or more sub-zones, e.g. a sub-zone situated above the cable(s), a sub-zone situated outside the space formed by two consecutive pylons, and a sub-zone situated between the two consecutive pylons and below the cable(s).

In addition, the method of the invention may further comprise a step of displaying the prohibited zone and the safe zone on at least one display device in such a manner as to warn an operative, e.g. a pilot of the aircraft, of the potential presence of at least one cable and of at least one pylon. In this way, the method of the invention may indicate to an operative the prohibited zone in which at least one pylon and at least one cable can potentially be situated, and the safe zone in which the aircraft can fly safely without any risk of coming into contact with a cable or with a pylon. The prohibited zone and the safe zone may be displayed in such a manner as to be superposed on an image of the landscape outside the aircraft.

The aircraft may have a pilot on board and include such a display device in order to inform the pilot of the prohibited and safe zones.

The pilot of the aircraft may also be placed remotely outside the aircraft, e.g. in a piloting station. In such a situation, the aircraft may be referred to as a "drone". The display device is then situated in the piloting station. For example, the piloting station may be situated on the ground, on a ship, or indeed on another aircraft. The pilot of the aircraft may also be placed remotely and pilot the aircraft visually by means of a remote control, it being possible for the aircraft to come momentarily out of the field of vision of the pilot, e.g. by being behind a building or still too far away to be visible.

The aircraft may also fly autonomously or automatically in compliance with the applicable national rules, i.e. without being steered by a human pilot, on-board or off-board, with an autopilot controlling the flight of the aircraft, optionally along a predetermined initial path. The autopilot may, for example, implement a method of automatically flying the aircraft by then itself using the method of detecting wire or wire-like obstacles in order to take into account the wire or wire-like obstacles through the prohibited and safe zones. Thus, while limiting the space-time excursions of the aircraft, the autopilot diverts the aircraft from the predetermined initial path to avoid a danger represented by a pylon and/or by a wire or wire-like obstacle.

Furthermore, the database used by the method of the invention is generated and stored in a memory previously. The database contains the characteristics of a plurality of known families of pylons and the characteristics of the cables that can be strung from each family of pylons. The database may also contain rules of an expert system, e.g. grouping together rules for design and installation of pylons and of cables that are used, for example, to design and manufacture pylons and cables. In addition, this database can be updated as a function of the possible changes in pylons and/or in cables, and of the changes in design rules or standards relating to pylons and to cables.

The method of the invention for detecting wire or wire-like obstacles may further have one or more of the following characteristics, taken individually or in combination.

In one aspect, the step of detecting at least one pylon in the surrounding environment of the aircraft may comprise the following sub-steps:

generating an image of the surrounding environment of the aircraft, by means of a detection device of the aircraft;

analyzing the image of the surrounding environment of the aircraft, e.g. using a computer; and identifying at least one pylon contained in the image of the surrounding environment, e.g. using said computer.

The sub-step of generating an image of the surrounding environment of the aircraft may be performed by emitting waves and by receiving said waves as sent back by an obstacle. The sub-step of generating an image of the surrounding environment of the aircraft may then, for example, comprise a step of emitting waves and a step of receiving said waves as sent back by an obstacle. The waves may be radio waves, with the detection device comprising, for example, a detector of the radar type, or be light waves, with the detection device comprising, for example, a detector of the LIDAR or LEDDAR type.

The sub-step of generating an image of the surrounding environment of the aircraft may also be performed by optical capture of an image of the surrounding environment, in the visible domain, i.e. the domain visible to the human eye, and/or in the infrared domain, for example. For example, the detection device comprises a video camera or still camera. The sub-step of generating an image of the surrounding environment of the aircraft then comprises a step of optically capturing an image of the surrounding environment.

The sub-step of generating an image of the surrounding environment of the aircraft may also be performed by merging the two above-mentioned sub-steps, namely by emitting waves and by receiving said waves as sent back by an obstacle, and by optically capturing an image of the surrounding environment.

The sub-steps of analyzing the image of the surrounding environment of the aircraft and of identifying at least one pylon contained in the image of the surrounding environment may be performed by means of a computer. The computer may use known methods, such as methods of recognizing shapes and objects, during such sub-steps in order to detect the presence of at least one pylon in the image of the surrounding environment of the aircraft.

For example, during the sub-steps of analyzing and identifying at least one pylon contained in the image of the surrounding environment, the method of the invention may implement a learning process that can be referred to as "deep learning". Such a learning process enables the computer performing the method of the invention to learn, to detect, and to identify a pylon, regardless of its shape or of its family, from among the numerous elements visible in the image of the surrounding environment of the aircraft, in particular seen from different angles and at different distances in order to facilitate detection of pylons.

Similarly, during the step of identifying a family of pylons to which said at least one detected pylon corresponds from among a database of families of pylons, the method of the invention may also put in place such a learning process of the "deep learning" type in order to identify the family of the detected pylon.

The step of detecting at least one pylon in the surrounding environment of the aircraft and the step of identifying a family of pylons to which said at least one detected pylon corresponds may be performed sequentially, the identification being performed after the detection. These detection and identification steps may also be performed simultaneously, the identification being performed substantially at the same time as the detection.

For example, such a learning process uses neural networks with which various algorithms are associated and that are known as "Long Short-Term Memory" (LSTM) networks and "Convolutional Neural Networks" (CNNs), and image processing software such as, for example, the "OpenCV" software.

In addition, the computer may comprise at least one processor and at least one memory, at least one integrated circuit, and at least one programmable system or indeed at least one logic circuit, these examples not limiting the scope given to the expression "computer". The computer may be integrated into the aircraft or indeed into the piloting station, if applicable. The computer may be a computer dedicated to performing the method of the invention or else be a computer shared with other functions of the aircraft and, for example, be integrated into an avionics system of the aircraft.

The computer may also be used by the method of the invention for generating the image of the surrounding environment of the aircraft on the basis of the information supplied by the detection device.

The memory may, for example, store one or more databases, in particular the database of families of pylons, as well as one or more computer programs or sub-programs, e.g. in the form of algorithms, in order to perform the method of the invention.

In addition, the step of identifying a family of pylons may comprise the following sub-steps:
  comparing said at least one pylon detected in the image of the surrounding environment of the aircraft with the database of families of pylons; and
  selecting the family of pylons to which said at least one pylon detected in the image corresponds.

The sub-step of comparing may be performed via the computer and uses the database of families of pylons.

In this way, each pylon detected in the image of the surrounding environment of the aircraft is compared with each family of pylons in the database in order to determine and to select the family of each pylon detected in the image with a view to deducing therefrom the zones in which one or more cables are potentially present. The sub-step of selecting may also be performed by means of the computer.

In addition, if no family of pylons in the database corresponds to the detected pylon, the method may advantageously associate with said detected pylon the family of pylons that is closest to said detected pylon. For example, the method may implement an algorithm that, by analogy with all of the types of pylons in the database, associates with the detected pylon the family of pylons that has the typology closest to the typology of the detected pylon.

This algorithm may, in particular analyze the characteristics of the pylons, e.g. whether the pylon is vertical and made of wood, or indeed has a metal lattice structure, the number of legs of the pylon, the number of arms each of which can potentially carry a cable, and the width and the height of the section in which each arm is situated. Presence of insulators makes it possible to determine that it is a pylon of an overhead power line and the number of insulators may contribute to identifying the family of the pylon. A specific shape at the top of the pylon and/or presence of cable cars makes it possible to determine that it is a pylon of a cable-car line.

During the step of characterizing at least one cable supported by each pylon detected in the image of the surrounding environment, at least one characteristic of said at least one cable supported by at least one detected pylon may be determined on the basis of the database and on the basis of the rules of the expert system that it may contain. This at least one characteristic of said at least one cable may be one of the following characteristics:
  a distance between two consecutive pylons between which at least one cable is strung, the two consecutive pylons having been detected in the surrounding environment of the aircraft;
  a distance between two consecutive pylons between which at least one cable is strung, the two consecutive pylons being a detected pylon and another pylon having at least one cable strung between it and said detected pylon, said other pylon not having been detected;
  a number of cables between two consecutive pylons;
  a category of said at least one cable; and
  a radius of curvature of said at least one cable between two consecutive pylons.

The database of the families of pylons may also contain said characteristics of each cable that can potentially be supported by each family of pylons. Among the categories of cables, mention can be made of the sheathed telephone cable, the electricity cable having multiple twisted strands, or indeed the cable-car cable, for example.

For example, the database of families of pylons may contain the category of each cable per family of pylons, the number of cables that can potentially be supported by each family of pylons, and the distances between two consecutive pylons supporting the cable or the same cables depending on the family of pylons. The database may also contain the value of the radius of curvature for each cable between two consecutive pylons depending on the family of pylons, said radius of curvature making it possible to determine over what height, measured vertically, the cable sags relative to the point from which it is strung from the pylon, and to deduce from that height the height of the sub-zone of the prohibited zone associated with said cable. Said height between a point from which the cable is strung from a pylon and its lowest point may also be a characteristic of a cable.

Two consecutive pylons are two pylons between which at least one common cable is strung. Another pylon is a pylon that has at least one cable strung between it and a pylon detected by the method during the detection step in the surrounding environment of the aircraft, said other pylon not being visible in the field of detection upstream and downstream from the detected pylon and, as a result, not being detected. However, after identifying the family of the detected pylon, the distance between said detected pylon and said other pylon may, advantageously, be estimated on the basis of the database and of the rules of the expert system that it may contain, even before said other pylon is in the field of detection of the detection device on board the aircraft. A position of at least one other pylon relative to a detected pylon may thus advantageously be estimated by the method of the invention.

Thus, the method advantageously makes it possible to determine a prohibited airspace zone that can potentially contain at least one pylon and at least one cable and that is therefore to be avoided during the flight of the aircraft. The method also makes it possible to determine a safe airspace zone that does not contain any pylon or any cable, and thus that is potentially to be used for safe flight of the aircraft.

Since it is possible to estimate the position of at least one other pylon relative to a detected pylon, the method of the invention may further comprise an additional step of estimating the position of at least one other pylon relative to a detected pylon. Then, once another pylon is actually detected by the method, said other pylon is replaced with the detected pylon.

In addition, the method of the invention may further comprise a step of displaying the prohibited zone and the safe zone on at least one display device in such a manner as to warn an operative, e.g. a pilot of an aircraft, of the potential presence of at least one cable and of at least one pylon. In this way, the method of the invention may indicate to an operative the prohibited zone in which at least one pylon and at least one cable can potentially be situated, and the safe zone in which the aircraft can fly safely without any risk of coming into contact with a cable or with a pylon.

The method of the invention may further comprise a step of estimating and displaying a predicted position of the aircraft with respect to the prohibited zone, and to the safe zone on said at least one display device. Said predicted position of the aircraft is estimated as a function of the current path of the aircraft. Said predicted position of the aircraft is displayed, e.g. in the form of a square, of a cross, or of a symbol representing the aircraft, and enables the pilot to view the path of the aircraft with respect to the prohibited and safe zones.

In addition, during the step of determining the prohibited and safe zones, the prohibited zone may contain at least two pylons and each cable supported by said at least two pylons. Said prohibited zone may be defined with a first safety distance with respect to each pylon and to each cable. The safe zone does not contain said at least two pylons and does not contain any cable. Said safe zone may be defined with a second safety distance with respect to each pylon and to each cable. The safe zone may also be defined with a second safety distance with respect to the prohibited zone. The first distance and the second distance correspond to safety margins with respect to the potential position of each pylon and to the potential position of each cable.

Each prohibited zone or safe zone may have shapes substantially identical respectively to each pylon and to each cable while taking into account the radius of curvature of each cable.

Each prohibited or safe zone may also have rectangular shapes respectively around each pylon and around each cable, while also complying with the safety distance.

The prohibited zone may also be defined as close as possible to each pylon and to each cable by the envelope determined during detection and identification of the pylons around each pylon and around each cable. The dimensions of the prohibited zone may then be defined as a function of a degree of confidence established during detection and identification of the detected pylon relative to the identified family of pylons. The degree of confidence corresponds to a percentage of certainty about the recognition of the family of the pylon established by the object recognition process.

The first distance and the second distance may be determined by a fuzzy logic method as a function of various different criteria.

Two criteria may be related to the aircraft and, for example, be the forward speed of the aircraft and the distance between firstly the aircraft and secondly a pylon or a cable. Said forward speed and said distance may thus vary during the flight of the aircraft. In addition, these two criteria, namely forward speed of the aircraft and distance between the aircraft and a pylon or a cable, may be combined to form another criterion of time before a possible impact of the aircraft with a pylon or with a cable. This time before a possible impact may be referred to as "Time Before Impact" or "TBI".

Another criterion may be the degree of confidence about the detection and the identification of said at least one pylon.

A safety zone may also be defined during the determination step by the first safety distance with respect to each pylon and to each cable. The safety zone may also be defined during the determination step by the first safety distance with respect to the prohibited zone. In this way, the safety zone covers zones not covered by the prohibited zone and by the safe zone. The safety zone may be formed by one or more sub-zones, e.g. a sub-zone being formed by each space situated between a prohibited zone and a safe zone.

Said safety zone thus defines a zone that can potentially not include any pylon and any cable, but that is situated in the vicinity of a pylon or of a cable. Said safety zone is thus a zone to be avoided during the flight of the aircraft.

The safety zone may also be displayed on at least one display device during the step of displaying the prohibited and safe zones in order to show its location to the pilot of the aircraft.

In another aspect, the method may further comprise an additional step of changing the prohibited and safe zones and, where applicable, the safety zone. During this additional step of changing the prohibited and safe zones and, where applicable, the safety zone, the dimensions of the prohibited and safe zones, and, where applicable, of the safety zone, may be modified, e.g. by modifying the values of the first and second safety distances, e.g. as a function of the various above-mentioned criteria, namely the forward speed of the aircraft and the distance between firstly the aircraft and secondly a pylon or a cable, the time before impact (TBI), and the degree of confidence about the detection and about the identification of said at least one pylon.

Each of these criteria may cause the values of the first and second safety distances, and therefore the dimensions of the prohibited and safe zones, to change individually and independently. The first safety distance and the second safety distance thus change continuously as a function of the variations in those criteria. Relationships of change, e.g. that are distinct for each criterion, then govern the change in the first and in the second safety distances as a function of the variation in each criterion.

These criteria may also be combined in order to cause the first and second safety distances, and therefore the dimensions of the prohibited zone or of the safety zone, and of the safe zone, to change. In this situation, a decision matrix may, for example, be defined for each contemplated combination of criteria, the dimension of said matrix being the number of combined criteria. For example, a matrix combining the criteria of the forward speed of the aircraft, of the time before impact (TBI) and of the degree of confidence about the detection is a three-dimensional matrix represented by a rectangular block or by a cube. Relationships of change are then associated with each square of the decision matrix in order to govern the change in the first and second safety distances as a function of the combined variation of said criteria.

The decision matrix may also be formed by a hypercube having n dimensions when n criteria are taken into account.

This additional step of changing the prohibited and the safe zones preferably uses a fuzzy logic method as a function of the values of a single criterion or of a combination of a plurality of criteria. The use of the fuzzy logic method makes it possible to determine values for the first and second safety distances, and therefore the dimensions of the prohibited zone or of the safety zone and of the safe zone, on the basis of the criteria that are not binary but that can change continuously.

The present invention also provides a system of detecting wire or wire-like obstacles that is configured to implement the above-mentioned method of detecting wire or wire-like obstacles. This detection system comprises:

- at least one detection device;
- at least one computer; and
- at least one display device.

The detection device may comprise at least one optical video camera, an obstacle detector of the LIDAR or LEDDAR type, and/or an obstacle detector of the radar type. For example, the computer may comprise at least one processor and at least one memory, at least one integrated circuit, and at least one programmable system, or indeed at least one logic circuit.

The present invention also provides an aircraft including such a detection system.

The computer of the detection system may be dedicated to performing the method of detecting wire or wire-like obstacles, or indeed be shared with other functions of the aircraft, and, for example, be integrated into an avionics system of the aircraft.

In addition, at least one display device of the detection system may be placed remotely in a piloting station communicating with the aircraft. In this situation, the aircraft includes a communications device co-operating with another communications device situated in the piloting station and connected to said at least one remote display device. This configuration is used when the aircraft is piloted remotely from the piloting station. For example, the piloting station may be situated on the ground, on a ship, or indeed on another aircraft.

Similarly, the computer may be placed remotely in the piloting station.

Finally, the present invention provides a detection set for detecting a wire or wire-like obstacle, which detection set comprises a piloting station and an aircraft.

The detection set for detecting a wire or wire-like obstacle includes a detection system as described above for detecting a wire or wire-like obstacle. For example, the aircraft includes said at least one detection device of the detection system for detecting a wire or wire-like obstacle and a first communications device, while the piloting station includes said at least one computer and said at least one display device of the detection system for detecting a wire or wire-like obstacle, as well as a second communications device. The first communications device co-operates with the second communications device so as to exchange firstly information captured by said at least one detection device and secondly navigation data, e.g. making it possible to pilot the aircraft remotely.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

Figure 1:
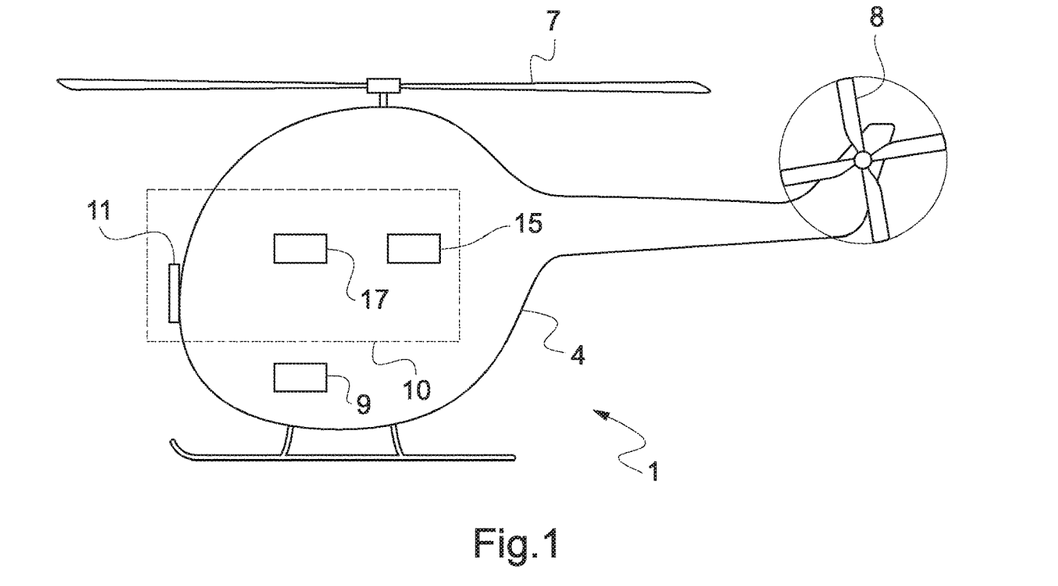
FIG. 1 shows an aircraft.

The aircraft 1 shown in FIG. 1 has for example a fuselage 4, an undercarriage having skids, a main rotor 7 arranged above the fuselage 4, an antitorque tail rotor 8 arranged on a tail boom of the aircraft 1, as well as a detection system 10 for detecting wire or wire-like obstacles, and an autopilot 9. The detection system 10 includes at least one detection device 11, at least one computer 15, and at least one display device 17.

The detection device 11 may comprise a video camera, an obstacle detector of the LIDAR type or of the LEDDAR type and/or an obstacle detector of the radar type.

For example, the computer 15 may comprise at least one processor and at least one memory, at least one integrated circuit, and at least one programmable system, or indeed at least one logic circuit.

The aircraft 1 shown in FIG. 1 may also have an onboard human pilot (not shown in the figure) piloting the aircraft 1.

The aircraft 1 may also fly automatically, the autopilot 9 controlling the flight of the aircraft 1 on its own, without any human intervention.

Figure 2:
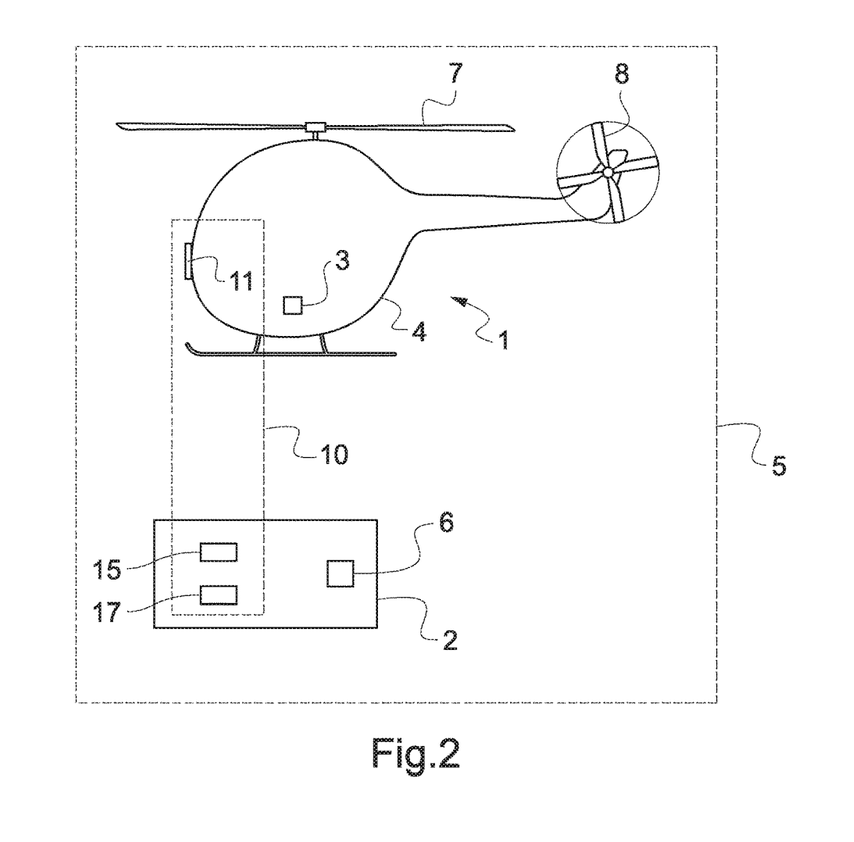
FIG. 2 shows a detection set for detecting a wire or wire-like obstacle.

The detection set 5 for detecting a wire or wire-like obstacle that is shown in FIG. 2 comprises a remote piloting station 2 and an aircraft 1, as well as a detection system 10 for detecting wire or wire-like obstacles that is provided with a detection device 11, with a computer 15, and with a display device 17. The aircraft 1 includes the detection device 11 of the detection system 10 and a first communications device 3. The piloting station 2 includes the computer 15 and the display device 17 of the detection system 10 as well as a second communications device 6.

In this situation, the aircraft 1 does have any human pilot on board, the human pilot being situated in the piloting station 2 in order to pilot the aircraft 1 remotely. The first communications device 3 then co-operates with the second communications device 6, in particular in order to exchange navigation data.

In addition, the first communications device 3 co-operates with the second communications device 6 in order to transmit information captured by the detection device 11 to the computer 15.

The computer 15 may also be situated on the aircraft 1, with the piloting station 2 not having any computer. In this situation, the results obtained by the computer 15 can be transferred from the aircraft 1 to the piloting station 2 via the first communications device 3 and via the second communications device 6.

In any event, the detection system 10 for detecting wire or wire-like obstacles is configured to implement a method of detecting wire or wire-like obstacles that is designed for an aircraft 1. This method of detecting wire or wire-like obstacles makes it possible, in a first stage, to detect at least one pylon in the surrounding environment of the aircraft 1, and to deduce therefrom a probable location for the cable or cables supported by each pylon detected, and optionally the positions of other, non-detected pylons.

To this end, the method of detecting wire or wire-like obstacles firstly includes a step of detecting at least one pylon in the surrounding environment of the aircraft 1.

This step of detecting at least one pylon in the surrounding environment of the aircraft 1 may be broken down into a plurality of sub-steps and, for example, include a sub-step of generating an image of the surrounding environment of the aircraft 1, a sub-step of analyzing the image of the surrounding environment of the aircraft 1, and a sub-step of identifying at least one pylon contained in the image of the surrounding environment.

The sub-step of generating an image of the surrounding environment of the aircraft 1 is performed by means of the detection device 11, optionally assisted by the computer 15.

Such an image of the surrounding environment may be generated by emission of waves, e.g. radio or light waves, and by reception of such waves as sent back by any obstacle in the surrounding environment of the aircraft 1, when the detection device 11 is of the radar type or indeed of the LIDAR or LEDDAR type.

Such an image of the surrounding environment may also be captured by a video camera that the detection device 11 then has.

The computer 15 makes it possible to perform the sub-steps of analyzing the image of the surrounding environment of the aircraft, and of identifying at least one pylon 51 contained in the image of the surrounding environment, e.g. by using known methods of analyzing images that optionally use a learning process of the "deep learning" type.

The method of detecting wire or wire-like obstacles then includes a step of identifying a family of pylons to which each previously detected pylon corresponds, each family of pylons being contained in a database of families of pylons. This database is accessible via the computer 15, e.g. by being stored in a memory of the computer 15 or indeed in a memory connected to the computer 15.

Figure 3:
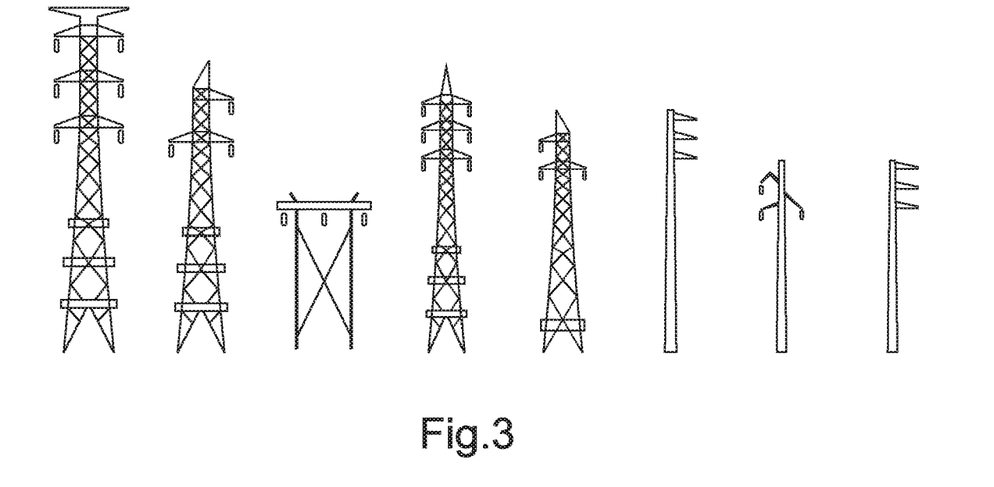
FIG. 3 shows various different families of pylons.

Examples of pylons that are representative of distinct families of pylons are shown in FIG. 3.

Figure 4:
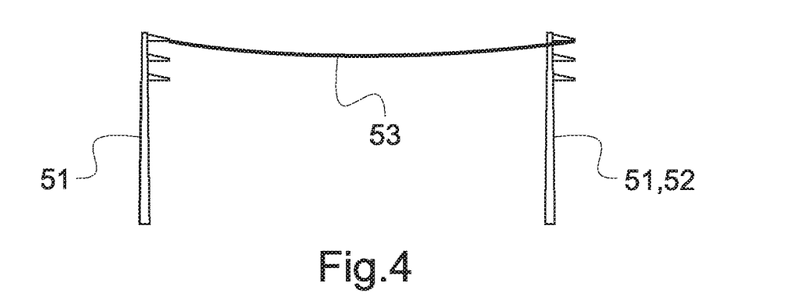
FIGS. 4 and 5 show two pylons and one or more cables.

The database of families of pylons also contains rules of an expert system that come, in particular, from the design and manufacture of pylons and of cables. These rules express the characteristics of each cable 53 strung from a detected pylon 51, e.g. the number of cables strung from a detected pylon 51, it being possible for these characteristics to depend on the family of the detected pylon 51. For example, FIG. 4 shows a single cable 53 strung between two consecutive pylons 51, 52.

Figure 5:
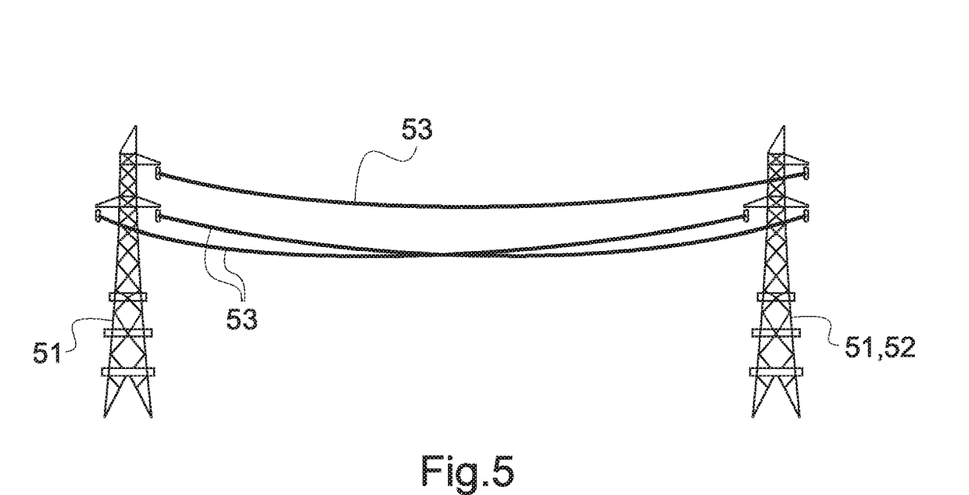

In another example, FIG. 5 shows three cables 53 strung between two consecutive pylons 51, 52 of a family different from the preceding family. The cables 53 sag to a greater extent than the cable 53 in FIG. 4 and the potential zone covered by the cables 53 extends over a height that is greater than for the cable 53 in FIG. 4.

The step of identifying the family of pylons of the detected pylon 51 may be performed by known methods of analyzing images, optionally by using a learning process of the deep learning type in order to identify the family of the detected pylon. This step of identifying the family of pylons of the detected pylon 51 may be broken down into a plurality of sub-steps and, for example, include a sub-step of comparing each pylon 51 detected in the image with the pylons contained in the database of families of pylons, and a sub-step of selecting the family of pylons to which each pylon 51 detected in the image corresponds.

The sub-step of comparing is performed via the computer 15 by using the information from the database of families of pylons. In this way, each pylon 51 detected in the image of the surrounding environment of the aircraft is compared with each family of pylons in the database in order to determine and to select the family of each pylon 51 detected in the image of the surrounding environment of the aircraft. A degree of confidence corresponding to a percentage of confidence in the detection of the family of pylons actually corresponding to the detected pylon 51 is determined simultaneously with this identification of the family of the detected pylon.

The method of detecting wire or wire-like obstacles further includes a step of characterizing at least one cable 53 supported by each detected pylon 51. One or more characteristics of at least one supported cable 53 are determined on the basis of the database and on the basis of rules of the expert system it contains. The database contains characteristics of the cable(s) potentially supported by a pylon and associated with each family of pylons.

One characteristic of a cable 53 may be a distance between two consecutive pylons 51, 52 between which at least one cable 53 is strung. The two consecutive pylons 51, 52 may have been detected in the surrounding environment of the aircraft 1, said at least one pylon 51 detected in the surrounding environment of the aircraft 1 comprising these two consecutive pylons 51, 52.

The two consecutive pylons 51, 52 may also be represented by detected pylon 51 and by another pylon 52 having at least one cable 53 strung between it and said detected pylon 51, said other pylon 52 not yet having been detected. The other pylon 52 may be outside the field of detection of the detection device 11 or indeed be at least partially masked by a tree, by a building or indeed by some other element of the surrounding environment so that it is prevented from being detected. Said at least one pylon 51 detected in the surrounding environment of the aircraft 1 then comprises only the detected pylon 51.

However, the position of at least one other pylon 52 relative to said detected pylon 51 may be estimated. The method of the invention may then include an additional step of estimating the position of at least one other pylon 52 relative to a detected pylon 51. Then, once the other pylon 52 is actually detected by the detection device 11, the real position of the pylon as detected supersedes the estimated position.

A characteristic of a cable may also be a number of cables 53 between two consecutive pylons 51, 52, a category of each cable 53, or indeed a radius of curvature of each cable 53 between two consecutive pylons 51, 52. A characteristic of a cable may also be a height of the cable 53, this height being equal to the vertical distance between a point from which the cable 53 is strung from a pylon 51, 52 and its lowest point.

For example, FIG. 4 shows a single cable 53 with a large radius of curvature strung between two consecutive pylons 51, 52.

In another example, FIG. 5 shows three cables 53 strung between two consecutive pylons 51, 52 of a different family from the preceding family, the three cables 53 being of smaller radius of curvature than the preceding radius of curvature.

The method of detecting wire or wire-like obstacles finally includes a step of determining a prohibited zone 21 that can potentially contain said at least one pylon 51 and said at least one cable 53 and a safe zone 23 not containing either said at least one pylon 51 or said at least one cable 53.

Figure 6:
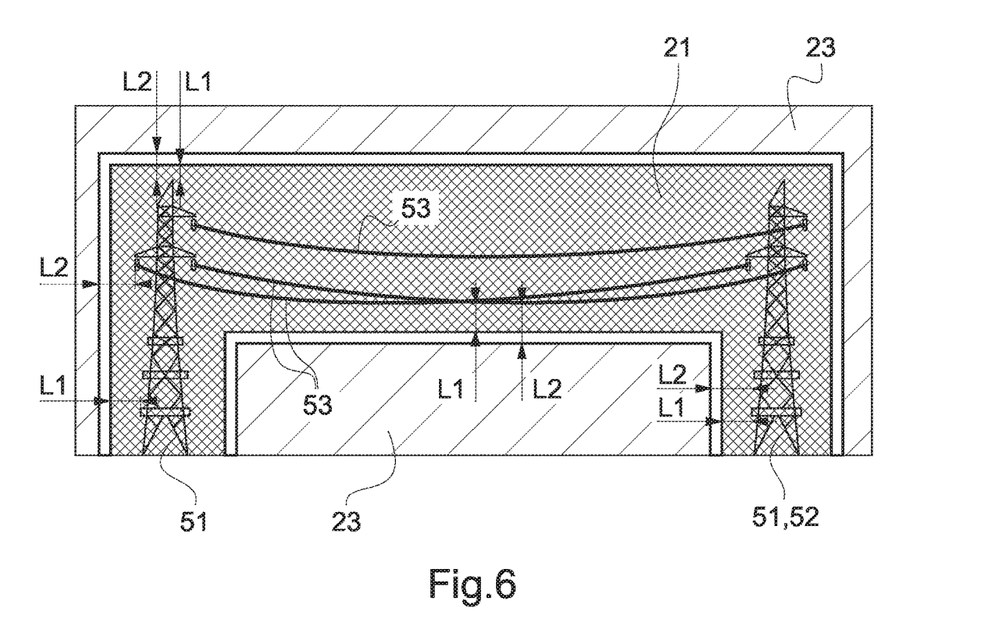
FIGS. 6 to 8 show representations of prohibited and safe airspace zones.

In the example of FIG. 6, the prohibited zone 21 contains two pylons 51, 52 and three cables 53 supported by the two pylons 51, 52. The prohibited zone 21 is thus a zone to be avoided during the flight of the aircraft 1 so as to circumvent the two pylons 51, 52 and the three cables 53.

In the example of FIG. 6, the prohibited zone 21 is defined with a safety margin with respect to the envelope determined during detection and identification of the pylons around each pylon 51, 52 and each cable 53. In this way, the prohibited zone 21 is defined by a first safety distance L1 corresponding to said safety margin with respect to each pylon 51, 52 and to each cable 53. For example, the prohibited zone 21 is formed by three rectangular sub-zones, namely two sub-zones associated with respective ones of the pylons 51, 52, and one sub-zone associated with three cables 53.

The prohibited zone 21 may also follow the shapes of the two pylons 51, 52 and of the cables 53 more precisely, while also maintaining the first safety distance L1 with respect to each pylon 51, 52 and with respect to the three cables 53.

The safe zone 23 does not contain the two pylons 51, 52 or the three cables 53 possibly supported by said at least two pylons 51, 52. The safe zone 23 is thus the zone to be preferred for safe flight of the aircraft 1 in order to circumvent the two pylons 51, 52 and the three cables 53.

The safe zone 23 is defined by a second safety distance L2 with respect to each pylon 51 and with respect to each cable 53. For example, the safe zone 23 is formed by two sub-zones, namely one sub-zone situated outside the space formed by the two pylons 51, 52 and by the three cables 53, and one sub-zone situated between the two pylons 51, 52 and below the cables 53.

The prohibited zone 21 and the safe zone 23 are determined on the basis of dimensional characteristics of each family of pylons coming from the database and on the basis of the safety distances L1, L2 relative respectively to the prohibited zone 21 and to the safe zone 23.

In addition, in FIG. 6, the prohibited zone 21 and the safe zone 23 are not contiguous, the second safety distance L2 being different from the first safety distance L1.

The dimensions of the prohibited zone 21 are thus determined as a function of the envelope determined while detecting and identifying the pylons around each pylon 51, 52 and around each cable 53, and as a function of the first distance L1, while the dimensions of the safe zone 23 are determined as a function of the second distance L2. The dimensions of the envelope around each pylon 51, 52 and around each cable 53 are, in particular, a function of a degree of confidence established during detection and identification of the detected pylon relative to the identified family of pylons. This degree of confidence corresponds to a percentage of certainty about the recognition of the family of the pylon established by the object recognition process.

The first distance L1 and the second distance L2 may be determined by a fuzzy logic method as a function of various different criteria. These criteria may be related to the aircraft 1 and, for example, include the forward speed of the aircraft 1, the distance between the aircraft 1 and a pylon 51, 52 or a cable 53, or indeed the Time Before Impact (TBI) of the aircraft 1 with a pylon 51, 52 or with a cable 53. Another criterion may be the degree of confidence about the detection of each pylon 51, 52 and of each cable 53.

Figure 7:
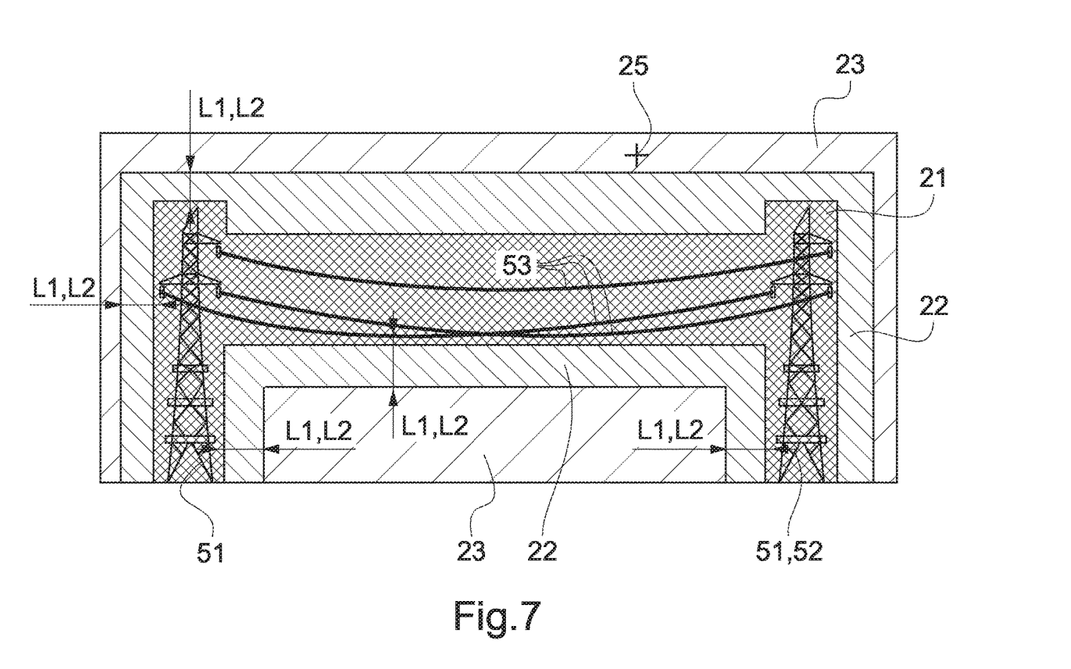

In the example of FIG. 7, the prohibited zone 21 contains two pylons 51, 52 and three cables 53 supported by the two pylons 51, 52. The prohibited zone 21 is defined by the envelope determined while detecting and identifying the pylons around each pylon 51, 52 and around each cable 53, and thus without any safety margin with respect to said envelope. The prohibited zone 21 is thus a zone to be avoided absolutely during the flight of the aircraft 1 so as to circumvent the two pylons 51, 52 and the three cables 53.

For example, the prohibited zone 21 is formed by three rectangular sub-zones, namely two sub-zones associated with respective ones of the pylons 51, 52, and one sub-zone associated with three cables 53.

A safety zone 22 may then be determined during the determination step in order to take into account a safety margin with respect to the prohibited zone 21, and thus with respect to each pylon 51, 52 and with respect to each cable 53. The safety zone 22 is defined by a first safety distance L1 corresponding to said safety margin with respect to the prohibited zone 21, and thus with respect to each pylon 51, 52 and to each cable 53.

Therefore, the prohibited zone 21 and the safety zone 22 are contiguous. The safety zone 22 is thus also a zone to be avoided during the flight of the aircraft 1 so as to circumvent the two pylons 51, 52 and the three cables 53 with a sufficient safety margin.

The safe zone 23 is defined, as in the example in FIG. 6, by a second safety distance L2 with respect to each pylon 51 and with respect to each cable 53. In this way, the safe zone 23 is defined by the second safety distance L2 with respect to the prohibited zone 21, and does not therefore contain the two pylons 51, 52 or the three cables 53 possibly supported by said at least two pylons 51, 52. The safe zone 23 is thus the zone to be preferred for safe flight of the aircraft 1 in order to circumvent the two pylons 51, 52 and the three cables 53.

For example, the safe zone 23 is formed by two sub-zones, namely one sub-zone situated outside the space formed by the two pylons 51, 52 and by the three cables 53, and one sub-zone situated between the two pylons 51, 52 and below the cables 53.

In addition, in FIG. 7, the safety zone 22 and the safe zone 23 are contiguous, the second safety distance L2 being equal to the first safety distance L1.

The dimensions of the prohibited zone 21 corresponding to the dimensions of the envelope around each pylon 51, 52 and around each cable 53 are determined as a function of the degree of confidence established during detection and identification of the detected pylon. The dimensions of the safety zone 22 and of the safe zone 23 are determined as a function of the first distance L1 and of the second distance L2.

The first distance L1 and the second distance L2 may be determined as above by using a fuzzy logic method, as a function of the above-mentioned criteria.

The method of detecting wire or wire-like obstacles may also include a step of displaying prohibited and safe zones 21, 23 on the display device 17. The safety zone 22 may also, where applicable, be displayed on the display device 17. In this way, an operative, e.g. a pilot of the aircraft 1, is informed of the potential presence of at least one cable and of at least one pylon in the surrounding environment of the aircraft 1 and can view the prohibited zone 21 and the safe zone 23. The prohibited zone 21, the safety zone 22, and the safe zone 23 may be displayed in such a manner as to be superposed on an image of the landscape outside the aircraft 1, on the display device 17.

For example, the prohibited zone 21 may be displayed on the display device 17 in red so as to indicate to the pilot of the aircraft 1 that he or she should avoid said prohibited zone 21. The safe zone 23 may be displayed on the display device 17 in green so as to indicate to the pilot of the aircraft 1 that the safe zone 23 is safe. The safety zone 22 may, where applicable, be displayed in amber, for example, so as to indicate to the pilot that, even though, normally, it does not contain any pylon 51, 52 or any cable 53, the safety zone 22 is nevertheless to be avoided.

It is also possible to display the prohibited zone 21, the safety zone 22, and the safe zone 23 with different levels of transparency in superposition on the image of the landscape outside the aircraft 1 in order to indicate the level of risk attached to each of said zones 21, 22, 23. For example, the prohibited zone 21 may be displayed on the display device 17 in a totally opaque manner in order to indicate to the pilot that he or she should avoid said prohibited zone 21. The safe zone 23 may be displayed on the display device 17 in totally transparent manner, and the safety zone 22 may, where applicable, be displayed in partially opaque manner, typically with transparency of 50%.

In addition, models of pylons and of cables may be displayed in such a manner as to be superposed on the image of the landscape outside the aircraft 1 in order to indicate the locations of the pylons 51, 52 and of the cables 53.

It is also possible to display the image of the landscape outside the aircraft 1 on a first portion of the display device 17 without modifying said image, and to display the image of the landscape outside the aircraft 1 on a second portion of the display device 17 with said image having undergone processing, in particular by displaying the prohibited zone 21, the safety zone 22, and the safe zone 23 optionally with different levels of transparency. In this manner, the pilot can immediately see the positions of the pylons 51, 52 and of the cables 53, and thus of the danger zones.

These different displays may be displayed on two distinct display devices 17 instead of on two portions of the same display device.

The method of the invention may also include a step of estimating and displaying a predicted position of the aircraft 1 with respect to the prohibited zone 21, to the safety zone 22, and to the safe zone 23 on the display device 17. This predicted position of the aircraft 1 is estimated as a function of its current path and is, for example, displayed in the form of a cross 25, as shown in FIG. 7, although other shapes may be used. This predicted position of the aircraft 1 enables the pilot to view its path with respect to the prohibited zone 21, to the safety zone 22, and to the safe zone 23.

The method may include an additional step of changing the dimensions of the prohibited zone 21, of the safety zone 22, and of the safe zone 23. During the additional step of changing the prohibited zone 21, the safety zone 22, and the safe zone 23, the dimensions of the safety zone 22 and of the safe zone 23 may be modified by, for example, modifying the values of the first and second safety distances L1, L2. The values of the first and second safety distances L1, L2 may be changed using a fuzzy logic method, as a function of the various different criteria mentioned above.

For example, when the speed of the aircraft 1 increases or indeed when the degree of confidence about the detection of an obstacle decreases, the safety margin taken relative to each pylon 51, 52 and/or each cable 53 may, for example, be increased and, as a result, the values of the first and second safety distances L1, L2 may also be increased.

The dimensions of the prohibited zone 21 may be modified as a function of the dimensions of the envelope determined during detection and identification of the pylons around each pylon 51, 52 and around each cable 53, and thus as a function of the degree of confidence in the detection and identification of the pylons.

Figure 8:
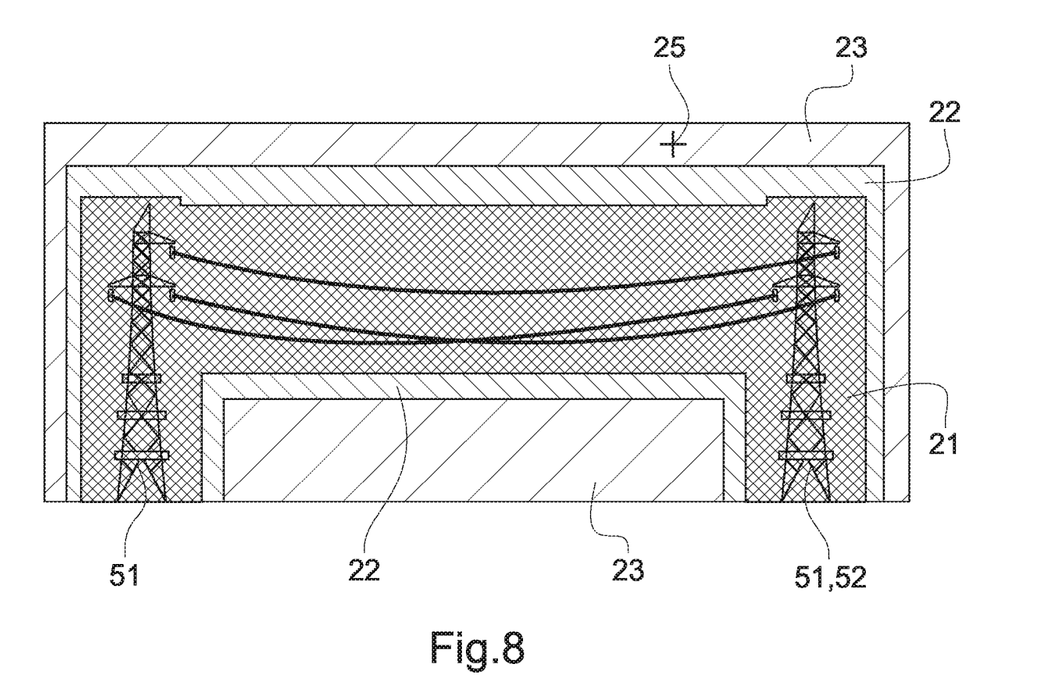

The representation of the prohibited zone 21, of the safety zone 22, and of the safe zone 23 shown in FIG. 8 shows, for example, a change in the dimensions of the prohibited zone 21, of the safety zone 22, and of the safe zone 23 with respect to FIG. 7 after a decrease in the degree of confidence and a decrease in the first and second safety distances L1, L2.

Each criterion involved in changing the prohibited zone 21, the safety zone 22, and the safe zone 23 may be taken into account individually and independently in order to cause the dimensions of said zones 21, 22, 23 to change, e.g. using the relationships of change of the first and second safety distances L1, L2. These criteria may also be combined together, e.g. using a decision matrix, in order to govern the change in the dimensions of the prohibited zone 21 and of the safe zone 23.

Figure 9:
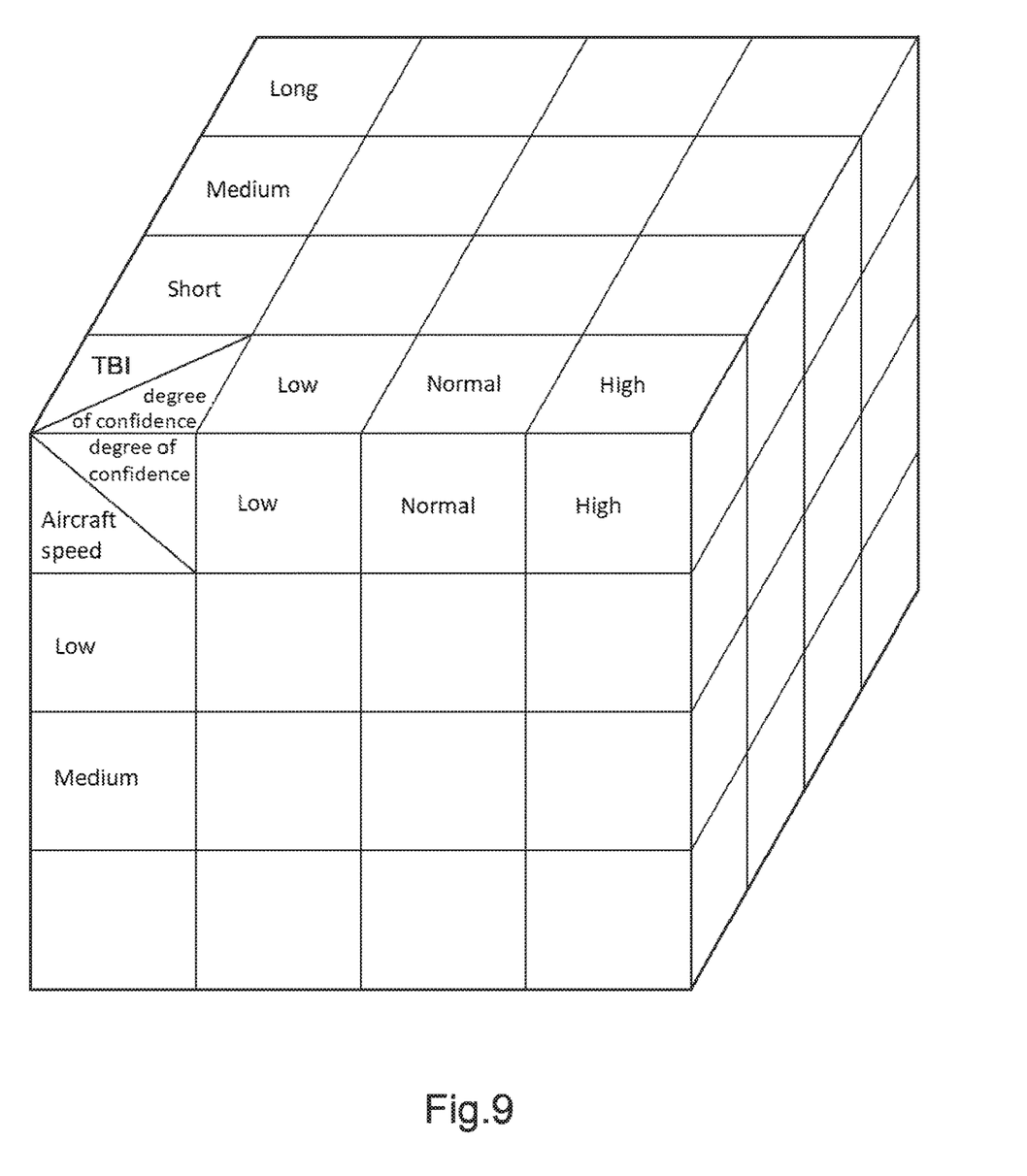
FIG. 9 shows a decision matrix.

Such a decision matrix is shown in FIG. 9. The decision matrix shown involves three criteria and represents a cube. For example, each square of the decision matrix is associated with a range of values for each criterion and may have a relationship of change of the prohibited zone 21, of the safe zone 23, and, where applicable, of the safety zone 22.

For example, for the criterion relating to the forward speed of the aircraft 1, three ranges may be defined that correspond respectively to a low speed, to a medium speed, and two a high speed. Similarly, for the criterion relating to the degree of confidence about detection of a pylon 51, 52, and of a cable 53, three ranges may also be defined that correspond respectively to a low degree of confidence, to a normal degree of confidence, and to a high degree of confidence. For the criterion relating to the time before a possible impact (TBI), three intervals may be defined, corresponding respectively to a short time, to a medium time, and to a long time.

These relationships of change make it possible to cause the dimensions of the prohibited zone 21, of the safe zone 23, and, where applicable, of the safety zone 22 to be caused to change, by variations in the dimensions of the envelope around each pylon 51, 52 and around each cable 53, and in the first and second safety distances L1, L2.

For example, a relationship of change may define a first percentage of increase in the prohibited zone 21, a second percentage of reduction in the safety zone 22, and a third percentage of reduction in the safe zone 23. For example, a relationship of change may define a first percentage of increase in the dimensions of the envelope around each pylon 51, 52 and around each cable 53, a second percentage of reduction in the first safety distance L1 and a third percentage of reduction in the second safety distance L2.

The square of the decision matrix to be applied at a given instant may, for example, be chosen by applying a fuzzy logic method applied to the various criteria. During the flight of the aircraft 1 and while it is coming closer to a detected pylon 51, new squares of the decision matrix are to be applied successively so that the dimensions of the prohibited zone 21, where applicable of the safety zone 22, and of the safe zone 23 change.

The prohibited zone 21, the safe zone 23, and, where applicable, the safety zone 22 are supplied to the computer 15 and optionally to the autopilot 9 when the aircraft 1 is flying automatically. A set of possible paths for the aircraft 1 with greater or lesser risks and/or coming more or less close to the power or structural limits of the aircraft 1 may then be determined. The method can therefore supply a new path to follow to avoid the obstacles, this new path being defined as being the best from among all of the possible paths. The possible paths may be determined by means of known algorithms of the "A*" or "dynamic A*" type, and the choice of the chosen path is made using known decision algorithms, e.g. evolutionary and/or genetic algorithms.

The method may also supply a new forward speed setpoint for the aircraft 1.

In addition, the choice of paths may also be learnt, either in real flight or in simulated flight, so that it is possible, with lower latency as the experience and the learning grows, to choose the best path as a function of a plurality of parameters, namely decision time, excursion relative to the corridor, the flight limits of the aircraft 1, and compliance with the limits as regards payload transported by the aircraft 1.

Naturally, the present invention may be subjected to numerous variations as to its implementation. Although several implementations and embodiments are described above, it should readily be understood that it is not conceivable to identify exhaustively all possible implementations and embodiments. It is naturally possible to envisage replacing any of the means described by equivalent means without going beyond the ambit of the present invention.

What is claimed is:

1. A method of detecting wire obstacles of an aircraft,
the aircraft including
a computer having
a memory with
a database of families of pylons stored therein,
the database of families of pylons containing
pylon characteristics of a plurality of families of pylons and cable characteristics of cables that can be supported by the plurality of families of pylons,
   wherein the method comprises the following steps:
   detecting at least one pylon in the surrounding environment of the aircraft via a detection device of the aircraft,
   wherein the detection device includes
   at least one optical video camera,
   an obstacle detector of the LIDAR or
   LEDDAR type, or
   an obstacle detector of the radar type;
   identifying a family of pylons to which the at least one detected pylon corresponds from among the plurality of families of pylons in the database of families of pylons;
   characterizing at least one cable supported by the at least one detected pylon on the basis of one or more of the cable characteristics of cables that can be supported by the identified family of pylons in the database; and
   determining, on the basis of at least one or more of the pylon characteristics of the identified family of pylons in the database,
   (i) a prohibited zone that can potentially contain the at least one detected pylon and the at least one cable and
   (ii) a safe zone not containing either the at least one pylon or the at least one cable;
   wherein, during the step of characterizing
   at least one cable supported by
   the at least one detected pylon
   at least one characteristic of the at least one cable supported by the at least one detected pylon is determined on the basis of the database and is one of the following characteristics:
   a distance between two consecutive pylons between which at least one cable is strung, the at least one detected pylon comprising the two pylons;
   a distance between two consecutive pylons between which the at least one cable is strung, the at least one detected pylon comprising a single pylon and another pylon that cannot be seen in the field of detection of the detection device and that has at least one cable strung between
   the another pylon and the detected pylon,
   the distance between the two consecutive pylons being estimated on the basis of the database of families of pylons;
   a number of cables between
   the consecutive pylons;
   a category of the at least one cable;
   a radius of curvature of the at least one cable between the two consecutive pylons; and
   a height between a point from which a cable is strung from a pylon and the lowest point of the cable.

2. The method according to claim 1,
   wherein the step of detecting at least one pylon in the surrounding environment of the aircraft comprises the following sub-steps:
   generating an image of the surrounding environment of the aircraft;
   analyzing the image of the surrounding environment of the aircraft; and
   identifying at least one pylon contained in the image of the surrounding environment.

3. The method according to claim 2,
   wherein the sub-step of generating an image of the surrounding environment of the aircraft comprises a step of emitting waves and a step of receiving the waves as sent back by an obstacle.

4. The method according to claim 3,
   wherein the waves are radio waves or light waves.

5. The method according to claim 2,
   wherein the sub-step of generating an image of the surrounding environment is performed using the optical video camera.

6. The method according to claim 1,
   wherein the step of identifying a family of pylons comprises the following sub-steps:
   comparing the at least one pylon detected in the image with the database of families of pylons; and
   selecting the family of pylons to which the at least one pylon detected in the image corresponds.

7. A method of detecting wire obstacles of an aircraft,
   wherein the method comprises the following steps:
   detecting at least one pylon in the surrounding environment of the aircraft via a detection device of the aircraft, wherein the detection device includes at least one optical video camera, an obstacle detector of the LIDAR or LEDDAR type, or an obstacle detector of the radar type;
   identifying a family of pylons to which the at least one detected pylon corresponds from among a database of families of pylons;
   characterizing at least one cable supported by the at least one detected pylon on the basis of the identified family of pylons in the database; and
   determining (i) a prohibited zone that can potentially contain the at least one detected pylon and the at least one cable and (ii) a safe zone not containing either the at least one pylon or the at least one cable;
   wherein, during the step of characterizing at least one cable supported by the at least one detected pylon at least one characteristic of the at least one cable supported by the at least one detected pylon is determined on the basis of the database and is one of the following characteristics:
   a distance between two consecutive pylons between which at least one cable is strung, the at least one detected pylon comprising the two pylons;

a distance between two consecutive pylons between which the at least one cable is strung, the at least one detected pylon comprising a single pylon and another pylon that cannot be seen in the field of detection of the detection device and that has at least one cable strung between the another pylon and the detected pylon, the distance between the two consecutive pylons being estimated on the basis of the database of families of pylons;

a number of cables between the consecutive pylons;

a category of the at least one cable;

a radius of curvature of the at least one cable between the two consecutive pylons; and a height between a point from which a cable is strung from a pylon and the lowest point of the cable.

8. The method according to claim 1,
wherein the method further comprises an additional step of estimating a position of at least one other pylon relative to a detected pylon, the at least one other pylon being not detected during the step of detecting at least one pylon in the surrounding environment of the aircraft.

9. The method according to claim 1,
wherein, during the step of determining the prohibited zone and the safe zone, the prohibited zone contains at least two pylons and the at least one cable and is defined with a first safety distance with respect to each pylon with respect to the at least one cable while the safe zone does not contain the two pylons or the at least one cable and is defined with a second safety distance with respect to each pylon and to the at least one cable.

10. The method according to claim 1,
wherein, during the step of determining, a safety zone is determined, the prohibited zone containing at least two pylons and the at least one cable, the safety zone being defined with a first safety distance with respect to the prohibited zone and the safe zone not containing the two pylons or the at least one cable and being defined with a second safety distance with respect to the prohibited zone.

11. The method according to claim 9,
wherein the first and second safety distances are determined by a fuzzy logic method.

12. The method according to claim 1,
wherein the method contains a step of displaying the prohibited zone and the safe zone on at least one display device.

13. The method according to claim 10,
wherein the method contains a step of displaying the prohibited zone, the safety zone, and the safe zone on at least one display device.

14. The method according to claim 12,
wherein the prohibited zone and the safe zone, and, where applicable, a safety zone, are displayed with different levels of transparency in superposition on an image of a landscape outside the aircraft so as to indicate a level of risk attached to each of the zones.

15. The method according to claim 12,
wherein, during the step of displaying, models of pylons and of cables are displayed in such a manner as to be superposed on the image of the landscape outside the aircraft so as to indicate locations of the pylons and of the cables.

16. The method according to claim 12,
wherein the method contains an additional step of estimating and of displaying a predicted position of the aircraft with respect to the prohibited zone and to the safe zone, and, where applicable, to a safety zone, on at least one display device.

17. The method according to claim 1,
wherein the method includes an additional step of changing the prohibited zone and the safe zone, during which step the dimensions of the prohibited zone and of the safe zone, and, where applicable, of a safety zone, are changed as a function of at least one or more flight criteria of the aircraft.

18. The method according to claim 17,
wherein the prohibited zone and the safe zone change on the basis of at least one criteria, from among:

a distance between firstly the aircraft and secondly a pylon or a cable;

the forward speed of the aircraft;

a time before a possible impact of the aircraft with a pylon or with a cable; and a degree of confidence about the detection of the at least one pylon and of the at least one cable.

19. The method according to claim 17,
wherein the additional step of changing the zones uses a fuzzy logic method and a decision matrix.

20. The method of claim 1,
wherein the method further comprises the step of automatically flying the aircraft with an autopilot that takes into account the prohibited zone and the safe zone.

21. A detection system for detecting wire obstacles of an aircraft, the detection system comprising:

at least one detection device configured to detect at least one pylon in the surrounding environment of the aircraft, wherein the detection device includes at least one optical video camera, an obstacle detector of the LIDAR or LEDDAR type, or an obstacle detector of the radar type;

at least one computer having a memory with a database of families of pylons stored therein, the database of families of pylons containing pylon characteristics of a plurality of families of pylons and cable characteristics of cables that can be supported by the plurality of families of pylons, the at least one computer configured to identify a family of pylons to which the at least one detected pylon corresponds from among the plurality of families of pylons in the database of families of pylons, characterize at least one cable supported by the at least one detected pylon on the basis of one or more of the cable characteristics of cables that can be supported by the identified family of pylons in the database, and determine, on the basis of at least one or more of the pylon characteristics of the identified family of pylons in the database, (i) a prohibited zone that can potentially contain the at least one detected pylon and the at least one cable and (ii) a safe zone not containing either the at least one pylon or the at least one cable; | and at least one display device configured to display the prohibited zone and the safe zone; and wherein, in order to characterize at least one cable supported by the at least one detected pylon, the at least one computer is further configured to determine on the basis of the database at least one characteristic of the at least one cable supported by the at least one detected pylon and the at least one characteristic of the at least one cable supported by the at least one detected pylon is one of the following characteristics: a distance between two consecutive pylons between which at least one cable is strung, the at least one detected pylon comprising the two pylons; a distance between two consecutive pylons between which the at least one cable is strung, the at least one detected pylon comprising a single pylon and another pylon that cannot be seen in the field of detection of the detection device and that has at least one cable strung between the another pylon and the detected pylon, the distance between the two consecutive pylons being estimated on the basis of the database of families of pylons; a number of cables between the consecutive pylons; a category of the at least one cable; a radius of curvature of the at least one cable between the two consecutive pylons; and a height between a point from which a cable is strung from a pylon and the lowest point of the cable.

22. The detection system of claim 21, wherein the at least one detection device, the at least one computer, and the at least one display device are all on-board the aircraft.

23. The detection system according to claim 21, wherein the at least one display device is placed remotely in a piloting station communicating with the aircraft.

24. A detection system for detecting wire obstacles of an aircraft, the detection system comprising:

at least one detection device and a first communications device on-board the aircraft, the detection device configured to detect at least one pylon in the surrounding environment of the aircraft; and a piloting station remotely located from the aircraft, the piloting station including at least one computer, at least one display device, and a second communications device, the at least one computer having a memory with a database of families of pylons stored therein, the database of families of pylons containing pylon characteristics of a plurality of families of pylons and cable characteristics of cables that can be supported by the plurality of families of pylons, the at least one computer configured to identify a family of pylons to which the at least one detected pylon corresponds from among the plurality of families of pylons in the database of families of pylons, characterize at least one cable supported by the at least one detected pylon on the basis of one or more of the cable characteristics of cables that can be supported by the identified family of pylons in the database, and determine, on the basis of at least one or more of the pylon characteristics of the identified family of pylons in the database, (i) a prohibited zone that can potentially contain the at least one detected pylon and the at least one cable and (ii) a safe zone not containing either the at least one pylon or the at least one cable, the at least one display device configured to display the prohibited zone and the safe zone, and the first communications device co-operating with the second communications device in order to exchange firstly information captured by the at least one detection device and secondly navigation data;

wherein, in order to characterize at least one cable supported by the at least one detected pylon, the at least one computer is further configured to determine on the basis of the database at least one characteristic of the at least one cable supported by the at least one detected pylon and the at least one characteristic of the at least one cable supported by the at least one detected pylon is one of the following characteristics: a distance between two consecutive pylons between which at least one cable is strung, the at least one detected pylon comprising the two pylons; a distance between two consecutive pylons between which the at least one cable is strung, the at least one detected pylon comprising a single pylon and another pylon that cannot be seen in the field of detection of the detection device and that has at least one cable strung between the another pylon and the detected pylon, the distance between the two consecutive pylons being estimated on the basis of the database of families of pylons;

a number of cables between the consecutive pylons;

a category of the at least one cable;

a radius of curvature of the at least one cable between the two consecutive pylons; and a height between a point from which a cable is strung from a pylon and the lowest point of the cable.

* * * * *